United States Patent
Khan et al.

(10) Patent No.: US 7,587,119 B2
(45) Date of Patent: Sep. 8, 2009

(54) OPTICAL WAVEGUIDE DEVICE

(75) Inventors: Sazzadur Rahman Khan, Ibaraki (JP); Kazunori Mune, Ibaraki (JP)

(73) Assignee: Nitto Denko Corporation, Ibaraki-Shi (JP)

( * ) Notice: Subject to any disclaimer, the term of this patent is extended or adjusted under 35 U.S.C. 154(b) by 0 days.

(21) Appl. No.: 12/127,891

(22) Filed: May 28, 2008

(65) Prior Publication Data

US 2008/0298747 A1 Dec. 4, 2008

Related U.S. Application Data

(60) Provisional application No. 60/954,711, filed on Aug. 8, 2007.

(30) Foreign Application Priority Data

May 29, 2007 (JP) ............................. 2007-142420

(51) Int. Cl.
G02B 6/10 (2006.01)
(52) U.S. Cl. .............................. 385/146; 385/45; 385/88
(58) Field of Classification Search ................. 385/14, 385/88, 40, 146, 45
See application file for complete search history.

(56) References Cited

U.S. PATENT DOCUMENTS

| 4,951,293 | A | | 8/1990 | Yamamoto et al. |
|---|---|---|---|---|
| 5,259,049 | A | | 11/1993 | Bona et al. |
| 5,914,709 | A | | 6/1999 | Graham et al. |
| 6,065,845 | A | * | 5/2000 | Miyazaki ....................... 362/26 |
| 7,139,048 | B2 | * | 11/2006 | Han et al. ....................... 349/62 |
| 7,360,937 | B2 | * | 4/2008 | Han et al. ..................... 362/608 |
| 7,446,828 | B2 | * | 11/2008 | Tamura et al. ................. 349/64 |
| 2003/0035634 | A1 | | 2/2003 | Shimada et al. |
| 2003/0214818 | A1 | * | 11/2003 | Ehara et al. .................. 362/558 |
| 2004/0012945 | A1 | * | 1/2004 | Yamashita et al. ............ 362/31 |
| 2004/0183774 | A1 | * | 9/2004 | Manabe et al. ............... 345/102 |
| 2005/0254771 | A1 | * | 11/2005 | Yamashita et al. ........... 385/146 |
| 2005/0270796 | A1 | | 12/2005 | Ichikawa et al. |

FOREIGN PATENT DOCUMENTS

| EP | 0 343 591 A | 11/1989 |
|---|---|---|
| EP | 0 532 816 A | 3/1993 |
| JP | 4-302481 A | 10/1992 |
| JP | 2004-288773 A | 10/2004 |

OTHER PUBLICATIONS

European Search Report mailed Oct. 17, 2008, issued in corresponding European Application No. 08009278.6.

* cited by examiner

*Primary Examiner*—Ellen Kim
(74) *Attorney, Agent, or Firm*—Westerman, Hattori, Daniels & Adrian, LLP.

(57) ABSTRACT

An optical waveguide device comprises a first under-cladding layer, a light emitting element provided on an upper surface of the first under-cladding layer and having a light emitting portion which emits light, and a core provided on the upper surface of the first under-cladding layer and having a light receiving portion which receives the light emitted from the light emitting portion of the light emitting element. The light receiving portion of the core has a generally U-shape as seen in plan, and the emitted light is projected into an opening of the generally U-shaped light receiving portion.

4 Claims, 3 Drawing Sheets

RELATED ART

OPTICAL WAVEGUIDE DEVICE

RELATED APPLICATIONS

This application claims the benefit of U.S. Provisional Application No. 60/954,711, filed on Aug. 8, 2007, which is hereby incorporated by reference.

BACKGROUND OF THE INVENTION

1. Field of the Invention

The present invention relates to an optical waveguide device which is widely used for optical communications, optical information processing and other general optics.

2. Description of the Related Art

In general, optical waveguide devices are configured such that light emitted from a light emitting element is transmitted through an optical waveguide (see, for example, U.S. Pat. No. 5,914,709). Such an optical waveguide device is schematically illustrated in FIG. 5. In FIG. 5, the optical waveguide device includes an optical waveguide provided on a substrate 10, and a light emitting element 50 fixed to the substrate 10 by an adhesive A in spaced relation from one end of the optical waveguide. A light beam L from the light emitting element 50 is incident on one end face of a core 30 of the optical waveguide, then transmitted through the core 30, and output from the other end face of the core 30. In FIG. 5, a reference numeral 20 denotes an under-cladding layer, and a reference numeral 40 denotes an over-cladding layer.

In the optical waveguide device, however, the core 30 has a rod shape, so that a light receiving surface (one end face) has a smaller area. This makes it difficult to align the light-receiving surface of the core 30 with a light projection axis of the light emitting element 50.

SUMMARY OF THE INVENTION

In view of the foregoing, it is an object of the present invention to provide an optical waveguide device which permits easy positioning of a light receiving surface of a core thereof with respect to a light projection axis of a light emitting element thereof.

To achieve the aforementioned object, an optical waveguide device according to the present invention comprises: a first under-cladding layer; a light emitting element provided on an upper surface of the first under-cladding layer and having a light emitting portion which emits light; and a core provided on the upper surface of the first under-cladding layer and having a light receiving portion which receives the light emitted from the light emitting portion of the light emitting element, wherein the light receiving portion of the core has a generally U-shape as seen in plan, and the emitted light is projected into an opening of the generally U-shaped light receiving portion.

In the present invention, the term "generally U-shape" is intended to include not only a U-shape, but also a V-shape, a semicircular arc shape and other shape having an opening into which the light emitted from the light emitting portion of the light emitting element can be projected.

In the inventive optical waveguide device, the light receiving portion of the core has a generally U-shape as seen in plan, and the light emitted from the light emitting portion of the light emitting element is projected into the opening of the generally U-shaped light receiving portion. Thus, a light receiving surface is defined on an inner surface of the generally U-shaped light receiving portion. Therefore, the light receiving surface has a greater light receiving area. This increases the freedom of positioning the light receiving surface of the core with respect to a light projection axis of the light emitting element, thereby facilitating the positioning.

Particularly, the light emitting portion of the light emitting element is positioned in the opening of the generally U-shaped light receiving portion of the core. In this case, even if the light projection axis of the light emitting element is significantly laterally offset, the emitted light can be received by the generally U-shaped inner surface. This further facilitates the positioning of the light receiving surface of the core with respect to the light projection axis of the light emitting element.

The optical waveguide device further comprises a second under-cladding layer provided as a height adjusting layer on a predetermined portion of the upper surface of the first under-cladding layer, and the core is provided on the upper surface of the first under-cladding layer with the intervention of the second under-cladding layer. In this case, if the light emitting portion of the light emitting element is disposed at a higher level, the height position of the core can be easily and properly adjusted to the height position of the light emitting portion of the light emitting element by providing the second under-cladding layer as the height adjusting layer.

DESCRIPTION OF THE PREFERRED EMBODIMENTS

Embodiments of the present invention will hereinafter be described in detail with reference to the attached drawings.

Figure 1A:
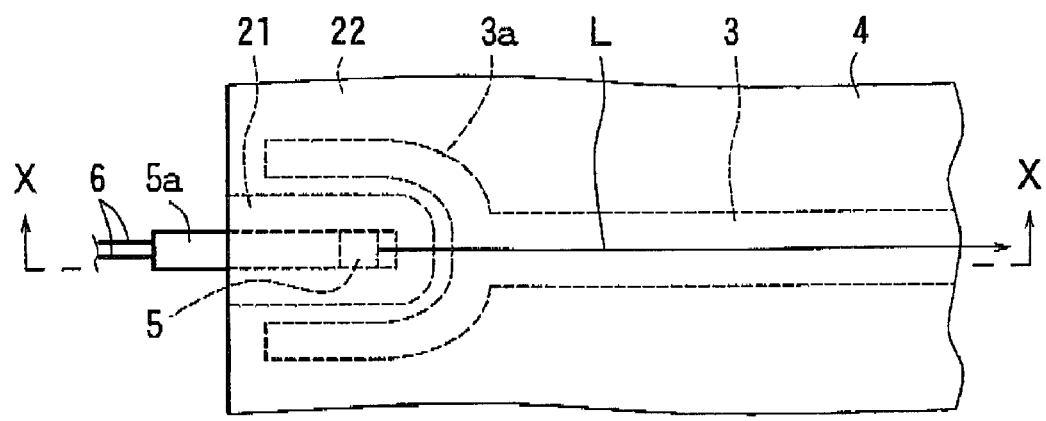
FIGS. 1(a) and 1(b) are a plan view and a sectional view taken along a line X-X in FIG. 1(a), respectively, which schematically illustrate an optical waveguide device according to one embodiment of the present invention.
Figure 1B:
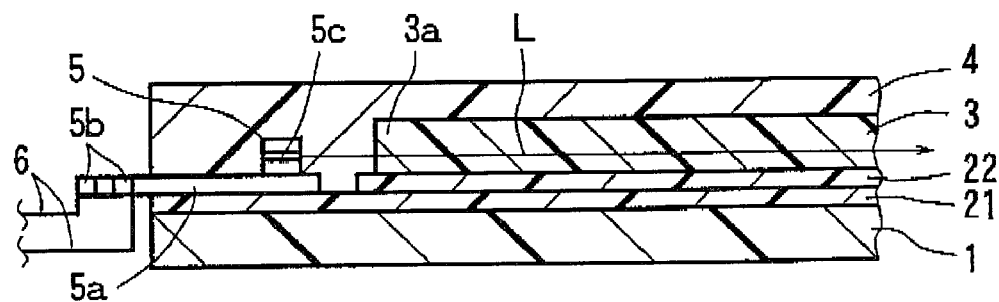

FIGS. 1(a) and 1(b) illustrate an optical waveguide device according to one embodiment of the present invention. In this embodiment, the optical waveguide device is provided on an upper surface of a substrate 1. In the optical waveguide device, a light emitting element 5 is provided on an upper surface of a first under-cladding layer 21, and a second under-cladding layer 22 is provided on a portion (predetermined portion) of the first under-cladding layer 21 except for an area in which the light emitting element 5 is provided. A core 3 serving as a path of a light beam L emitted from the light emitting element 5 is provided in a predetermined pattern on an upper surface of the second under-cladding layer 22. The second under-cladding layer 22 serves as a height adjusting layer for adjusting the height position of the core 3 to a height position at which the light beam L emitted from a light emitting portion 5c of the light emitting element 5 can be received. The core 3 has a light receiving portion 3a provided at one end thereof for receiving the light beam L emitted from the light emitting element 5. The light receiving portion 3a has a U-shape as seen in plan (in FIG. 1(a), a U-shape having a lateral opening which opens to the left side). The light emitting element 5 is positioned in the opening of the U-shaped light receiving portion, so that the light emitting portion 5c of the light emitting element 5 is surrounded by the U-shaped light receiving portion 3a. The light projection axis of the light emitting portion 5c of the light emitting element 5 preferably extends longitudinally of the core 3 (as shown in FIGS. 1(a) and 1(b)). However, the direction of the light projection axis is not particularly limited, as long as the light projection axis extends toward an inner surface of the U-shaped light receiving portion 3a. In this embodiment, a transparent over-cladding layer 4 is provided as covering the light emitting element 5 and the core 3. In FIGS. 1(a) and 1(b), a reference character 5a denotes a lead frame having one end portion on which the light emitting element 5 is fixed, and the other end portion provided with terminals (wiring connection portions) 5b connected to the light emitting element 5.

In the optical waveguide device, the light beam L projected toward the light receiving portion 3a of the core 3 from the light emitting element 5 passes through the over-cladding layer 4, and is incident on the U-shaped inner surface of the light receiving portion 3a of the core 3 to enter the light receiving portion 3a of the core 3. If the direction of the projected light beam L coincides with the longitudinal axis of the core 3 (as shown in the figures), the light beam L travels longitudinally of the core 3 as it is. On the other hand, if the direction of the projected light beam L does not coincide with the longitudinal axis of the core 3 (shown in the figures) but extends aslant with respect to the longitudinal axis, the light beam L is repeatedly reflected in the U-shaped light receiving portion 3a of the core 3, and finally travels longitudinally of the core 3. Then, the light beam L is output from the other face of the core 3. In the optical waveguide device, the entire U-shaped inner surface of the light receiving portion 3a thus serves as a light receiving surface, so that a light receiving area can be increased. This obviates the need for precisely positioning the light receiving surface of the core 3 with respect to the light projection axis of the light emitting element 5, thereby facilitating the positioning.

An exemplary production method for the optical waveguide device will be described.

Figure 2A:
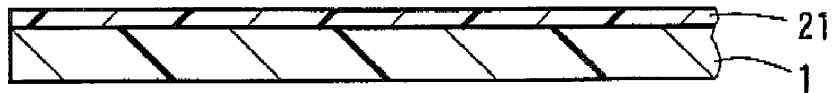
FIGS. 2(a) to 2(e) are explanatory diagrams schematically showing a method of producing the inventive optical waveguide device.

First, a planar substrate 1 (see FIG. 2(a)) is prepared. The substrate 1 is not particularly limited, but exemplary materials for the substrate 1 include glass, polymer film, quartz, silicone, resins and metals. The thickness of the substrate 1 is not particularly limited, but is typically in the range of 20 μm to 2 mm.

In turn, a first under-cladding layer 21 is formed in a predetermined region on an upper surface of the substrate 1 as shown in FIG. 2(a). Examples of a material for the formation of the first under-cladding layer 21 include photosensitive resins, polyimide resins and epoxy resins. The formation of the first under-cladding layer 21 is achieved in the following manner. A varnish prepared by dissolving any of the aforementioned resins in a solvent is applied on the substrate 1. The application of the varnish is achieved, for example, by a spin coating method, a dipping method, a casting method, an injection method, an ink jet method or the like. Then, the varnish is cured. Where a photosensitive resin is employed as the material for the formation of the first under-cladding layer 21, the curing is achieved by exposing the applied varnish to radiation. An exposed portion of the varnish serves as the first under-cladding layer 21. Where a polyimide resin is employed as the material for the formation of the first under-cladding layer 21, the curing is typically achieved by a heat treatment at 100° C. to 400° C. for 60 to 180 minutes. The thickness of the first under-cladding layer 21 is typically in the range of 5 μm to 50 μm. Thus, the first under-cladding layer 21 is formed.

Figure 2B:
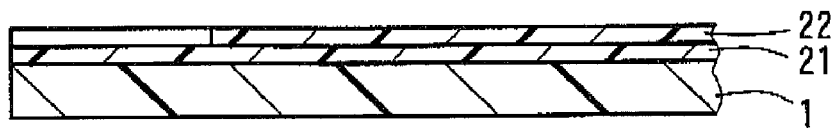
Figure 2C:
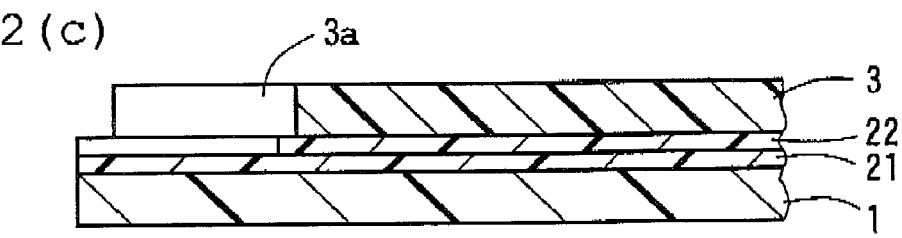
Figure 2D:
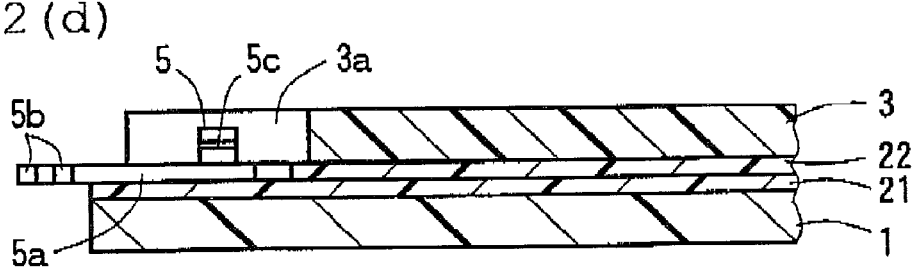

Next, as shown in FIG. 2(b), a second under-cladding layer 22 is formed on a predetermined portion of the upper surface of the first under-cladding layer 21 except for an area in which a light emitting element 5 (see FIG. 2(d)) is to be provided. A photosensitive resin is used as a material for the formation of the second under-cladding layer 22. The formation of the second under-cladding layer 22 is achieved by selectively exposing a predetermined portion of the photosensitive resin to radiation. The exposed predetermined portion serves as the second under-cladding layer 22.

Figure 2E:
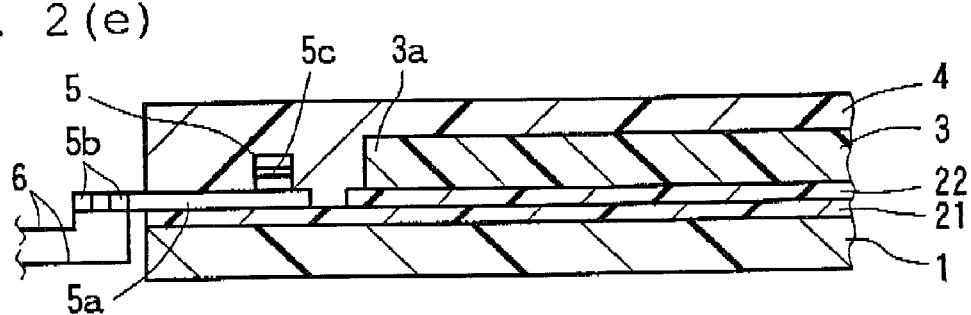

Subsequently, a core 3 is formed on an upper surface of the second under-cladding layer 22 as shown in FIG. 2(c). At this time, one end portion (light receiving portion 3a) of the core 3 is formed as having a U-shape, so that a light emitting portion 5c of the light emitting element 5 to be provided in the subsequent step (see FIG. 2(d)) can be surrounded by the U-shaped portion. A material for the formation of the core 3 is typically a photosensitive resin, which has a greater refractive index than the material for the formation of the second under-cladding layer 22 and a material for formation of an over-cladding layer 4 (see FIG. 2(e)) described later. The refractive index may be adjusted, for example, by selection of the types of the materials for the formation of the second under-cladding layer 22, the core 3 and the over-cladding layer 4 and adjustment of the composition ratio thereof. The formation of the core 3 is achieved in the following manner. A varnish prepared by dissolving the photosensitive resin in a solvent is applied on the under-cladding layer 22 in the same manner as described above. The application of the varnish is achieved in the same manner as described above, for example, by a spin coating method, a dipping method, a casting method, an injection method or an ink jet method. Then, the varnish is dried to form a resin layer. The drying is typically achieved by a heat treatment at 50° C. to 120° C. for 10 to 30 minutes.

Then, the resin layer is exposed to radiation through a photo mask (not shown) formed with an opening pattern corresponding to a pattern of the core 3. An exposed portion of the resin layer serves as the core 3 after an unexposed portion removing step. More specifically, examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 mJ/cm$^2$ to 10000 mJ/cm$^2$, preferably 50 mJ/cm$^2$ to 3000 mJ/cm$^2$.

After the exposure, a heat treatment is performed to complete a photoreaction. The heat treatment is performed at 80° C. to 250° C., preferably at 100° C. to 200° C., for 10 seconds to two hours, preferably for five minutes to one hour. Thereafter, a development process is performed by using a developing agent to dissolve away an unexposed portion of the resin layer. Thus, the remaining portion of the resin layer has the pattern of the core 3. Exemplary methods for the development include an immersion method, a spray method and a puddle method. Examples of the developing agent include an organic solvent and an organic solvent containing an alkaline aqueous solution. The developing agent and conditions for the development are properly selected depending on the composition of the photosensitive resin.

Then, the developing agent remaining after the development is removed by a heat treatment. The heat treatment is typically performed at 80° C. to 120° C. for 10 to 30 minutes. The remaining resin layer thus patterned serves as the core 3. The core 3 typically has a thickness of 5 μm to 30 μm, and typically has a width of 5 μm to 30 μm.

Next, as shown in FIG. 2(*d*), the light emitting element 5 is placed together with a lead frame 5*a* in an opening of the U-shaped light receiving portion 3*a* of the core 3 on the upper surface of the first under-cladding layer 21. At this time, terminals (wiring connection portions) 5*b* provided on the other end portion of the lead frame 5*a* are positioned outward of an edge of the first under-cladding layer 21. The placement of the light emitting element 5 may be achieved with the use of no adhesive or with the use of a very small amount of an adhesive for tentative fixing thereof. This is because the light emitting element 5 is fixed by forming an over-cladding layer 4 to cover the light emitting element 5 in the subsequent step (see FIG. 2(*e*)). Typically employed as the light emitting element 5 is a light emitting diode, a laser diode, a VCSEL (Vertical Cavity Surface Emitting Laser) or the like.

Then, as shown in FIG. 2(*e*), a transparent over-cladding layer 4 is formed on the upper surfaces of the first and second under-cladding layers 21, 22 to cover the light emitting element 5 and the core 3. Thus, the light emitting element 5 is held and fixed between the first under-cladding layer 21 and the over-cladding layer 4. Examples of a material for the formation of the over-cladding layer 4 include those employed as the materials for the formation of the first and second under-cladding layers 21, 22, but a transparent one is selected from those materials. The material for the formation of the over-cladding layer 4 may be the same as or different from the materials for the formation of the first and second under-cladding layers 21, 22. The formation of the over-cladding layer 4 is achieved in the same manner as the formation of the first or second under-cladding layer 21, 22. The thickness of the over-cladding layer 4 is typically 20 to 100 μm.

Further, the terminals (wiring connection portions) 5*b* of the light emitting element 5 are respectively connected to wirings 6 by a wire bonding method or the like.

Thus, the optical waveguide device (see FIGS. 1(*a*) and 1(*b*)) including the first and second under-cladding layers 21, 22, the core 3, the over-cladding layer 4 and the light emitting element 5 is produced on the upper surface of the substrate 1.

Figure 3:
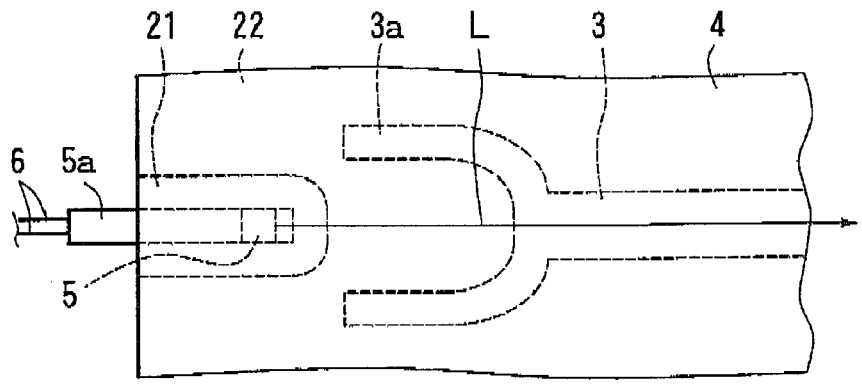
FIG. 3 is a plan view schematically illustrating a modification of the optical waveguide device.

In the embodiment described above, the light emitting element 5 is positioned in the opening of the U-shaped light receiving portion 3*a*. However, the light emitting element 5 may be positioned outside the U-shaped portion as shown in FIG. 3, as long as the light can be received on the U-shaped inner surface.

Figure 4:
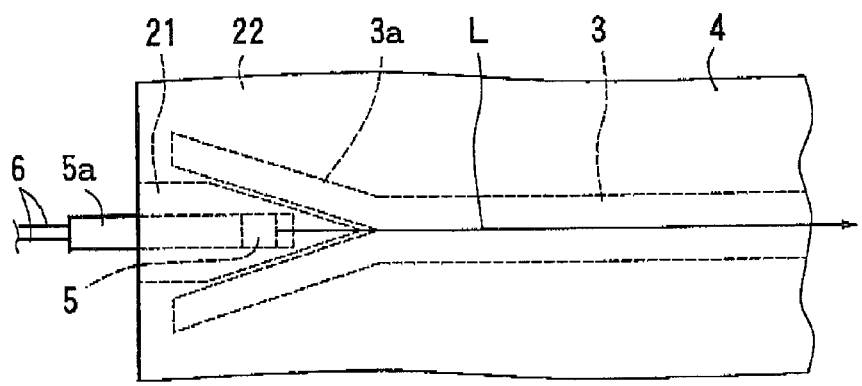
FIG. 4 is a plan view schematically illustrating another modification of the optical waveguide device.
Figure 5:
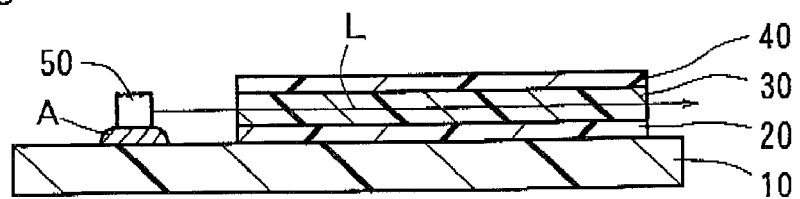
FIG. 5 is a sectional view schematically illustrating a related art optical waveguide device.

In the embodiment described above, the shape of the one end portion (light receiving portion 3*a*) of the core 3 is a U-shape as seen in plan, but is not limited to the U-shape. For example, as shown in FIG. 4, the light receiving portion 3*a* may have a V-shape as seen in plan. Even in this case, the same functions and effects are provided.

In the embodiment described above, the second under-cladding layer 22 is formed to adjust the height position of the core 3 to the height position at which the light beam L from the light emitting portion 5*c* of the light emitting element 5 can be received. If there is no need to adjust the height position of the core 3 to the height position of the light emitting portion 5*c* of the light emitting element 5, the optical waveguide device may be configured without the provision of the second under-cladding layer 22. In this case, the core 3 is provided on the upper surface of the first under-cladding layer 21.

The over-cladding layer 4 is provided in the embodiment described above, but the over-cladding layer 4 is not essential. The optical waveguide device may be configured without the provision of the over-cladding layer 4.

In the embodiment described above, the terminals (wiring connection portions) 5*b* of the light emitting element 5 are positioned outward of the edge of the first under-cladding layer 21, but the terminals 5*b* may be positioned on the first under-cladding layer 21. In this case, the terminals 5*b* may be covered with the over-cladding layer 4 after the terminals 5*b* are respectively connected to the wirings 6 by a wire bonding method.

Next, an inventive example will be described. However, the present invention is not limited to this example.

EXAMPLE

Material for Formation of First and Second Under-Cladding Layers and Over-Cladding Layer A material for formation of first and second under-cladding layers and an over-cladding layer was prepared by mixing 35 parts by weight of bisphenoxyethanolfluorene diglycidyl ether (Component A), 40 parts by weight of 3',4'-Epoxycyclohexylmethyl-3,4-Epoxycyclohexane carboxylate which is an alicyclic epoxy resin (CELLOXIDE 2021P manufactured by Daicel Chemical Industries, Ltd.) (component B), 25 parts by weight of (3',4'-Epoxycyclohexane)methyl-3',4'-Epoxycyclohexyl-carboxylate (CELLOXIDE 2081 manufactured by Daicel Chemical Industries, Ltd.) (component C), and 1 part by weight of a 50% propione carbonate solution of 4,4'-bis[di(p-hydroxyethoxy)phenylsulfinio]phenylsulfide bishexafluoroantimonate (photoacid generator, Component D).

Material for Formation of Core

A material for formation of a core was prepared by dissolving 70 parts by weight of the aforementioned component A, 30 parts by weight of 1,3,3-tris{4-[2-(3-oxetanyl)]butoxyphenyl}butane and 0.5 part by weight of the aforementioned component D in 28 parts by weight of ethyl lactate.

Production of Optical Waveguide Device

The first under-cladding layer material was applied on an upper surface of a glass substrate (having a thickness of 1.0 mm) by a spin coating method, and then irradiated with ultraviolet radiation at 2000 mJ/cm$^2$. Subsequently, a heat treatment was performed at 100° C. for 15 minutes, whereby a first under-cladding layer (having a thickness of 15 μm) was formed.

Then, a second under-cladding layer (having a thickness of 50 μm) was formed on a predetermined portion of the upper surface of the first under-cladding layer except for a light emitting diode provision area in the same manner as in the formation of the first under-cladding layer.

Subsequently, the core material was applied on an upper surface of the second under-cladding layer by a spin coating method, and dried at 100° C. for 15 minutes. In turn, a synthetic quartz photo mask having an opening pattern conformable to a core pattern was placed above the resulting core material film. After the core material film was exposed to ultraviolet radiation emitted from above at 4000 mJ/cm$^2$ by a contact exposure method, a heat treatment was performed at 120° C. for 15 minutes. Subsequently, a development process was performed by using a γ-butyrolactone aqueous solution to dissolve away an unexposed portion, and then a heat treatment was performed at 120° C. for 30 minutes, whereby a core (having a sectional size of 12 μm (width)×24 μm (height)) was formed as having a V-shaped end portion (light receiving portion) as seen in plan.

Next, a light emitting diode was tentatively fixed to the upper surface of the first under-cladding layer in an opening of the V-shaped light receiving portion of the core with the use of a very small amount of a UV-curable adhesive.

In turn, the over-cladding layer material was applied on the first and second under-cladding layers to cover the light emitting diode and the core by a spin coating method, and then irradiated with ultraviolet radiation at 2000 mJ/cm². Subsequently, a heat treatment was performed at 150° C. for 60 minutes. Thus, an over-cladding layer (having a thickness of 35 μm) was formed.

Then, wirings were respectively connected to terminals of the light emitting diode by a wire bonding method.

Thus, an optical waveguide device including the first and second under-cladding layers, the core, the over-cladding layer and the light emitting diode was produced on the substrate.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide device comprising:
   a first under-cladding layer;
   a light emitting element provided on an upper surface of said first under-cladding layer and having a light emitting portion which emits light; and
   a core in a rod shape provided on the upper surface of said first under-cladding layer and having
      a light receiving portion provided on one end of the core for receiving the light emitted from said light emitting portion of the light emitting element and
      a core light emitting portion on an other end of the core for emitting the light received at the light receiving portion,
   wherein said light receiving portion of the core is formed in a generally U-shape having a greater width than the other portion of the core as seen in plan, and the emitted light from the light emitting element is projected into an opening of the generally U-shaped light receiving portion.

2. An optical waveguide device as set forth in claim 1, wherein said light emitting portion of the light emitting element is positioned in said opening of the generally U-shaped light receiving portion of the core.

3. An optical waveguide device as set forth in claim 1, further comprising:
   a second under-cladding layer provided as a height adjusting layer on a predetermined portion of said upper surface of the first under-cladding layer except for an area in which the light emitting element is provided,
   wherein said core is provided on the upper surface of the first under-cladding layer with the second under-cladding layer therebetween.

4. An optical waveguide device as set forth in claim 2, further comprising:
   a second under-cladding layer provided as a height adjusting layer on a predetermined portion of said upper surface of the first under-cladding layer except for an area in which the light emitting element is provided,
   wherein said core is provided on the upper surface of the first under-cladding layer with the second under-cladding layer therebetween.

* * * * *